United States Patent
Lee (10) Patent No.: US 10,250,107 B2
(45) Date of Patent: Apr. 2, 2019

(54) MAGNETIC-CONTROLLED GENERATOR WITH BUILT-IN CONTROLLER

(71) Applicant: CHI HUA FITNESS CO., LTD., Hsinchu County (TW)

(72) Inventor: Ying-Che Lee, Hsinchu County (TW)

(73) Assignee: Chi Hua Fitness Co., Ltd., Hsinchu County (TW)

( * ) Notice: Subject to any disclaimer, the term of this patent is extended or adjusted under 35 U.S.C. 154(b) by 0 days.

(21) Appl. No.: 15/831,629

(22) Filed: Dec. 5, 2017

(65) Prior Publication Data

US 2018/0102695 A1 Apr. 12, 2018

Related U.S. Application Data

(63) Continuation-in-part of application No. 14/825,282, filed on Aug. 13, 2015, now abandoned.

(51) Int. Cl.
| | | |
|---|---|---|
| *A63B 1/00* | (2006.01) | |
| *H02K 1/14* | (2006.01) | |
| *H02K 11/33* | (2016.01) | |
| *H02K 7/02* | (2006.01) | |
| *H02K 11/00* | (2016.01) | |
| *H02K 1/27* | (2006.01) | |
| *H02K 1/12* | (2006.01) | |
| *H02K 24/00* | (2006.01) | |
| *A63B 21/005* | (2006.01) | |
| *A63B 22/06* | (2006.01) | |
| *A63B 24/00* | (2006.01) | |

(Continued)

(52) U.S. Cl.
CPC .......... *H02K 11/33* (2016.01); *A63B 21/0053* (2013.01); *A63B 22/0605* (2013.01); *A63B 24/0087* (2013.01); *H02K 1/12* (2013.01); *H02K 1/2786* (2013.01); *H02K 7/02* (2013.01); *H02K 7/104* (2013.01); *H02K 7/1861* (2013.01); *H02K 11/0094* (2013.01); *H02K 11/35* (2016.01); *H02K 24/00* (2013.01); *H02K 49/043* (2013.01); *A63B 21/0051* (2013.01); *A63B 21/225* (2013.01); *A63B 2024/0093* (2013.01); *A63B 2220/54* (2013.01); *A63B 2225/50* (2013.01); *B60L 2210/30* (2013.01); *H02K 21/222* (2013.01); *H02P 3/18* (2013.01); *H02P 3/24* (2013.01)

(58) Field of Classification Search
CPC ................................ A63B 22/08; H02K 1/146
USPC ............................................... 482/63; 310/74
See application file for complete search history.

(56) References Cited

U.S. PATENT DOCUMENTS

2009/0174271 A1* 7/2009 Lin .................. H02K 1/146
310/153

* cited by examiner

*Primary Examiner* — Eduardo Colon Santana
*Assistant Examiner* — Cortez M Cook
(74) *Attorney, Agent, or Firm* — Rosenberg, Klein & Lee (57) ABSTRACT

Disclosed is a magnetic-controlled generator with built-in controller that has integrated design of power generator with magnetic resistance and control circuit unit. The built-in control circuit unit is electrically connected to an armature core, an external digital operator, and a magnetic coil, in order to convert AC power produced by the armature core into DC power to supply for the magnetic coil and meanwhile control the resistance of a flywheel by inserting a number of torque value to the external digital operator. In addition, a software is built inside the generator for instant torque calibration without connecting to extra devices. In application to training machines, the device is easy to be installed and operated without restrictions in extra spaces for a controller and configuration of wires.

6 Claims, 11 Drawing Sheets

(51) Int. Cl.
  *H02K 7/104*  (2006.01)
  *H02K 7/18*   (2006.01)
  *H02K 49/04*  (2006.01)
  *H02K 11/35*  (2016.01)
  *A63B 21/22*  (2006.01)
  *H02K 21/22*  (2006.01)
  *H02P 3/18*   (2006.01)
  *H02P 3/24*   (2006.01)

MAGNETIC-CONTROLLED GENERATOR WITH BUILT-IN CONTROLLER

This patent application is a continuation-in-part of Ser. No. 14/825,282 filed on Aug. 13, 2015, currently pending.

BACKGROUND OF THE INVENTION

1. Field of the Invention

The present invention relates to a magnetic-controlled generator, particularly to one that is applied to training machines with a built-in control unit to integrate a power generator with a magnetic resistance structure.

2. Description of the Related Art

Figure 1A:
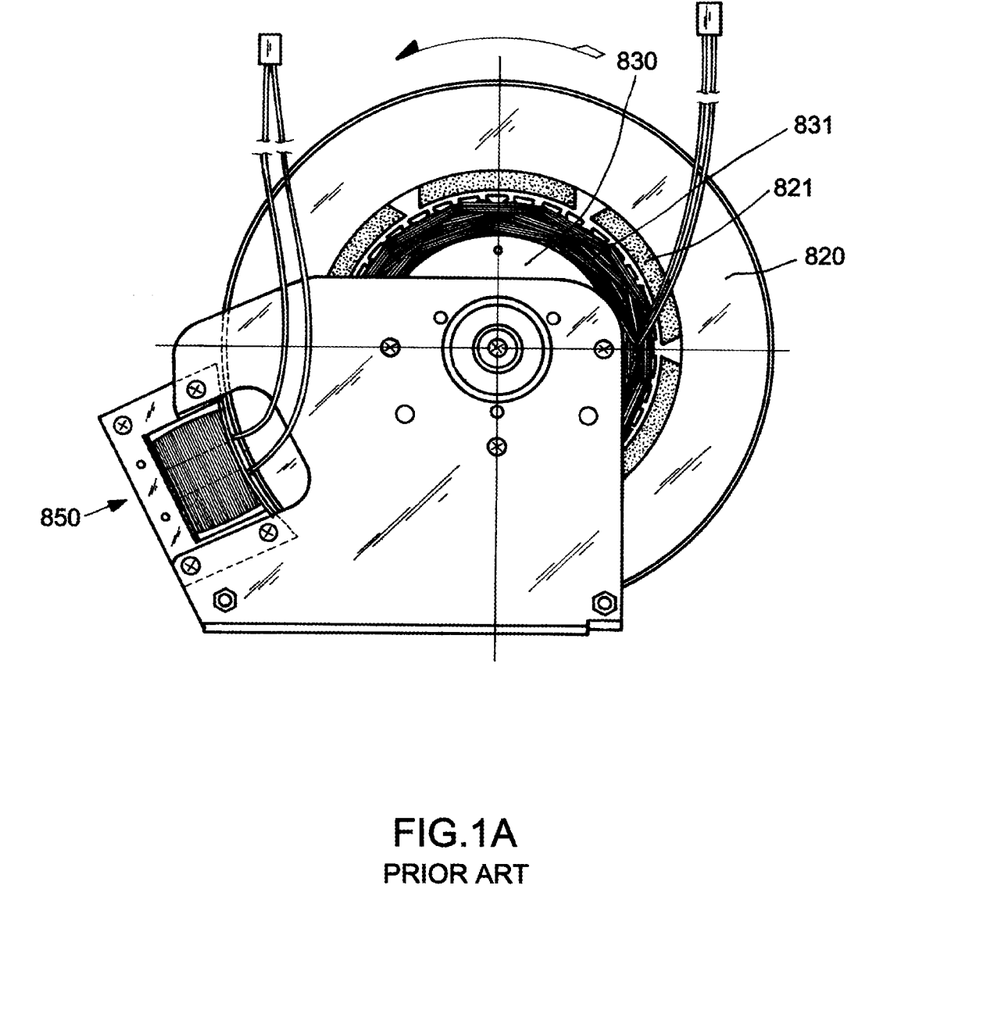
FIG. 1A is a side elevation view of a conventional brake device combining a power generator with eddy-current magnetic resistance.
Figure 1B:
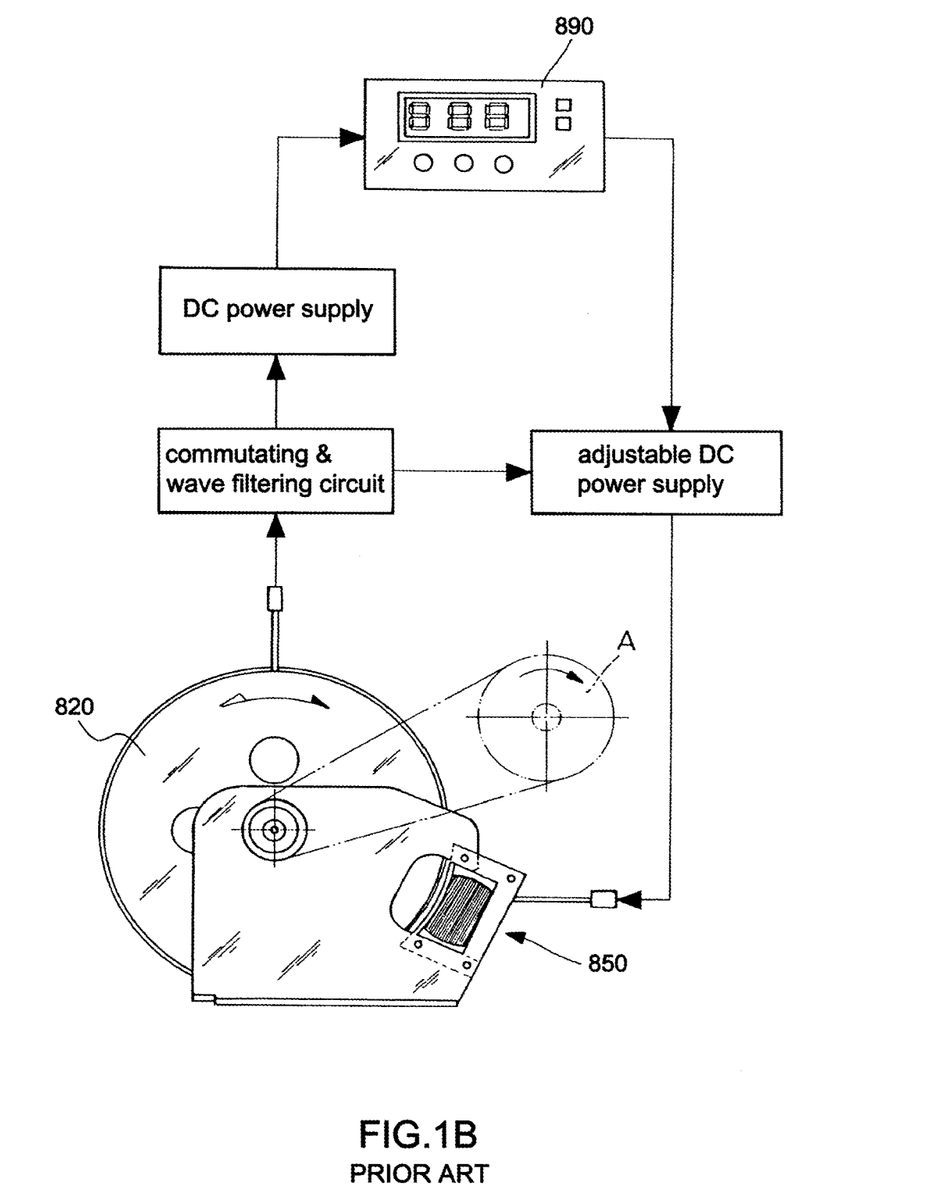
FIG. 1B is a schematic diagram illustrating the controlling structure of a conventional brake device combining a power generator with eddy-current magnetic resistance.

Many training machines have a flywheel to support the inertia of rotation, and the flywheel can be the loading for training. Recently, a structure of having a flywheel with a permanent magnet as a rotor and an armature as a stator is commonly applied. It has a stator coil producing AC currents for controlling and brake loading. Such structure has been disclosed in U.S. Pat. No. 6,084,325 as shown in FIGS. 1A and 1B and in U.S. Pat. No. 7,732,961 as shown in FIG. 2.

In FIGS. 1A and 1B, a flywheel 820 is rotated by a rotary wheel A. A permanent magnet 821 is fitted in the flywheel 820 to form a magnetic field with a stator core 830 to produce currents supplied for a display & control gauge 890 and a brake core 850 arranged aside the flywheel 820 after conversion. The brake core 850 consequently has eddy current against the flywheel 820. The application principle in the structure of FIG. 2 is similar to the one in FIG. 1A; the only difference is that the brake core 850 in FIG. 1A is arranged on the outer edge of the flywheel 820, and the brake core 980 in FIG. 2 is on the inner edge of the flywheel 820.

The structures disclosed above can produce electricity power by the force from operators to form magnetic resistance as a loading for training, which has excellent training function. However, the structures produce high power of electricity with large magnetic resistance and are therefore suitable for large devices only. It would not be a good choice for small devices. The inventor thus tries to find a structure that would reduce the loading, the volume, and the manufacturing costs; in other words, that is suitable for small devices.

Figure 2:
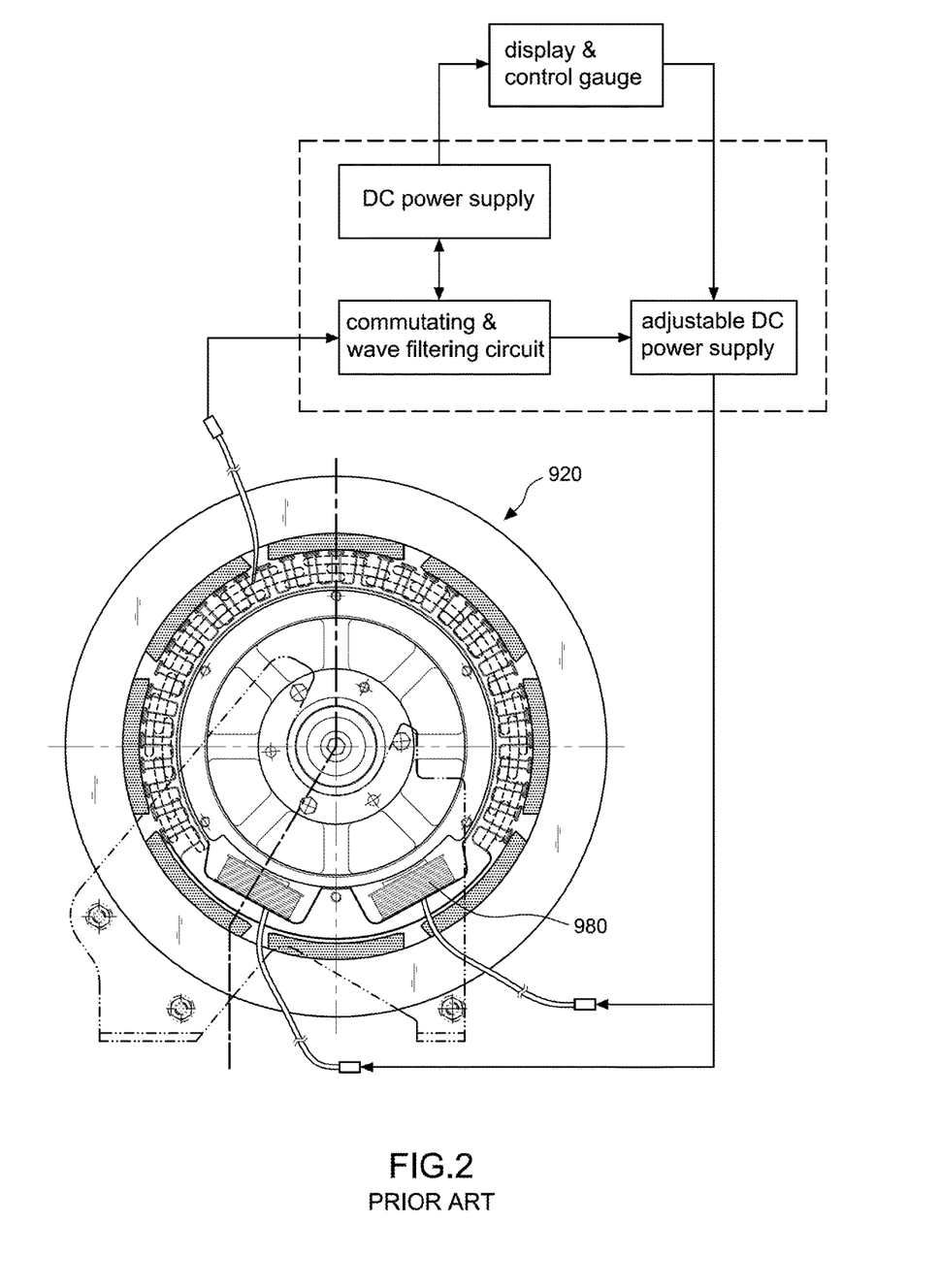
FIG. 2 is a schematic diagram of a conventional power generator with built-in eddy-current resistance.
Figure 3:
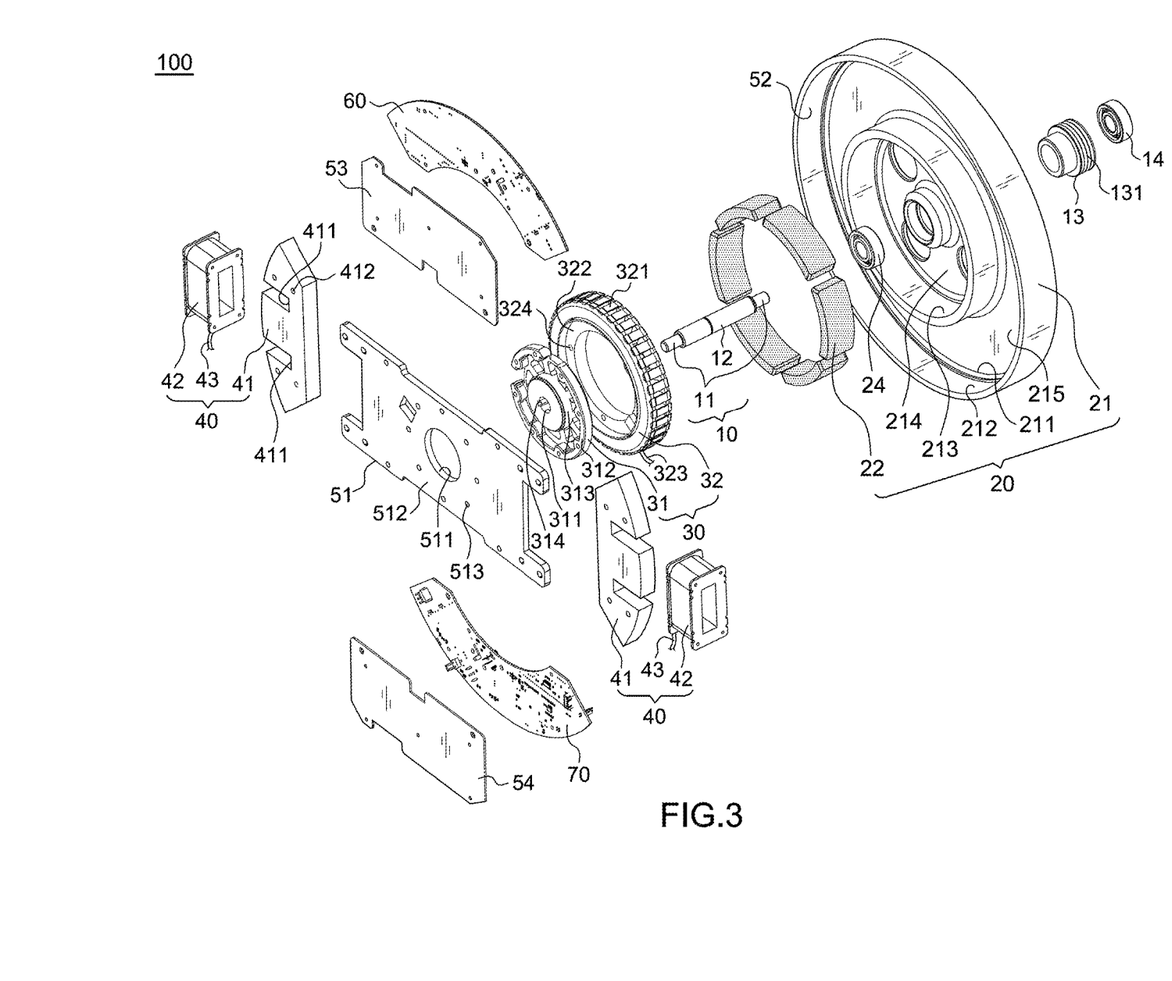
FIG. 3 is an exploded view of the present invention in a preferred embodiment.
Figure 4:
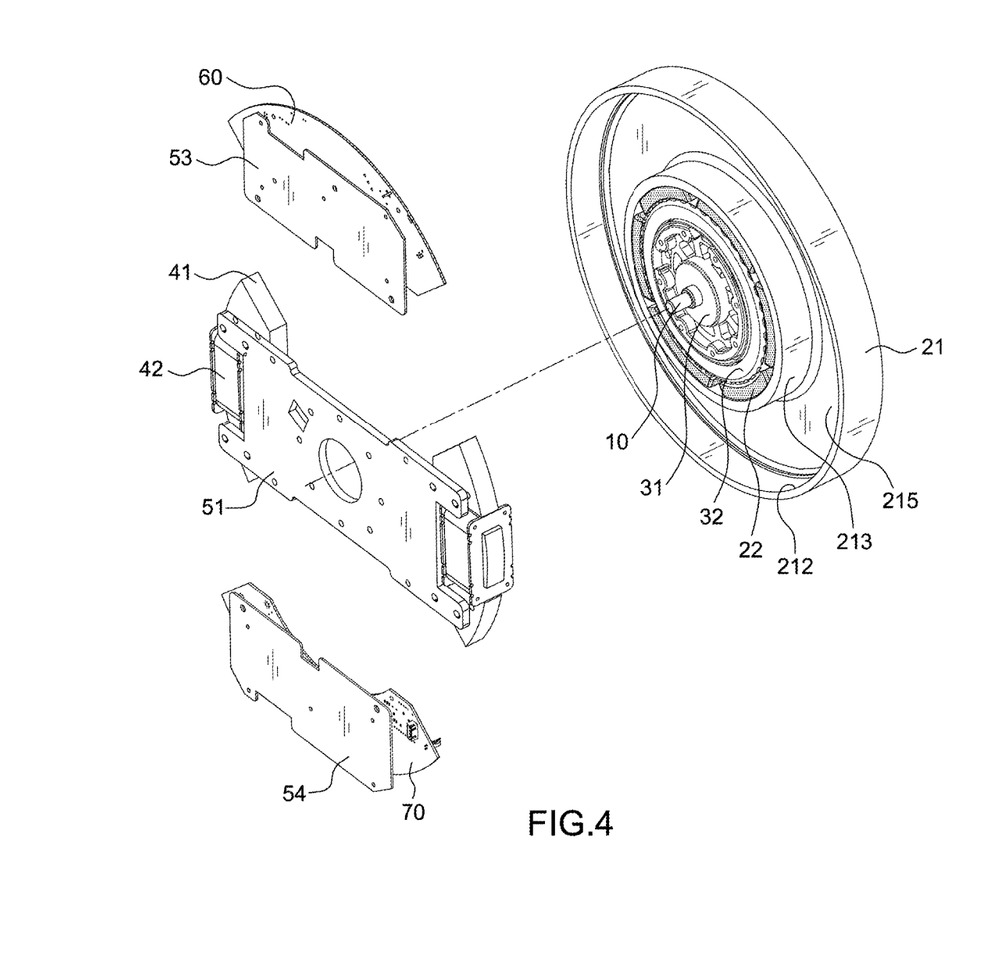
FIG. 4 is another exploded view of the present invention in a preferred embodiment.
Figure 5:
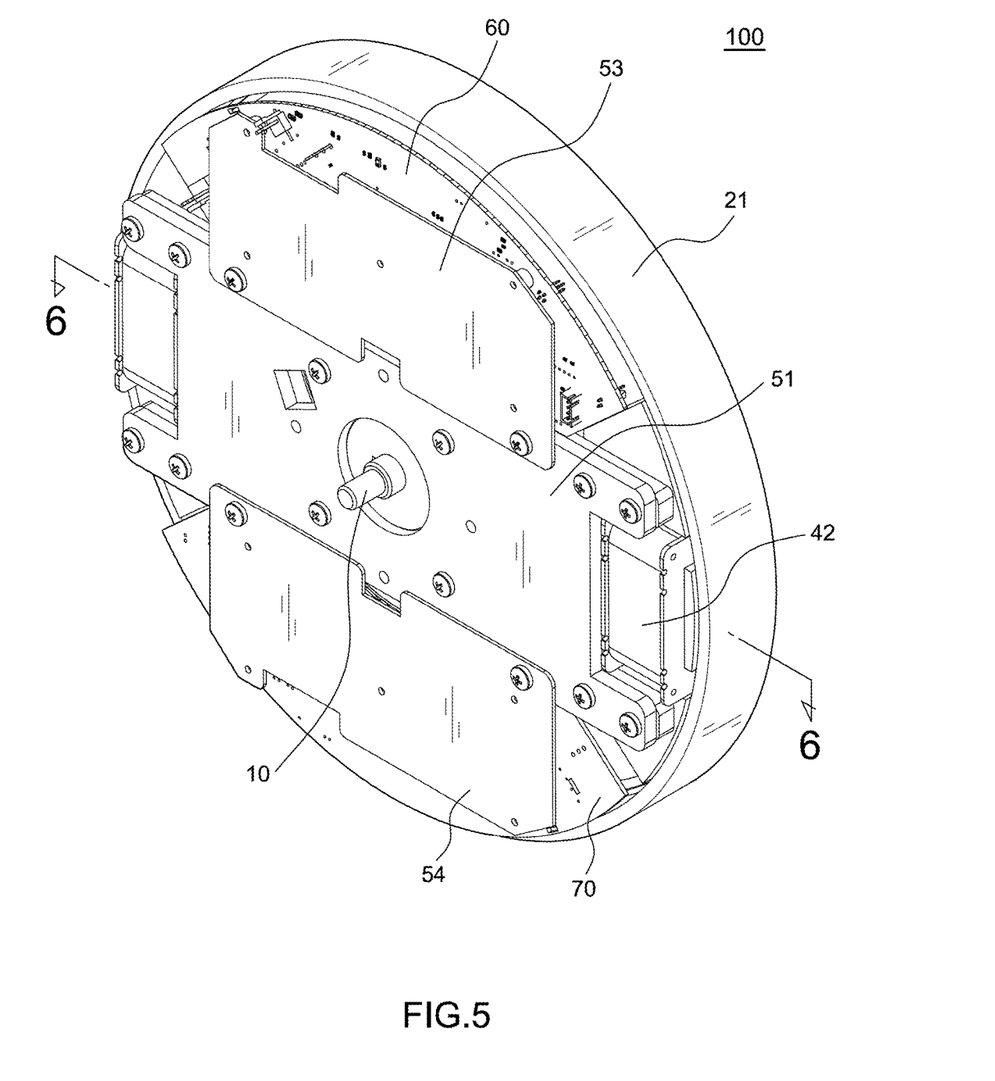
FIG. 5 is a perspective view of the present invention in a preferred embodiment.
Figure 6:
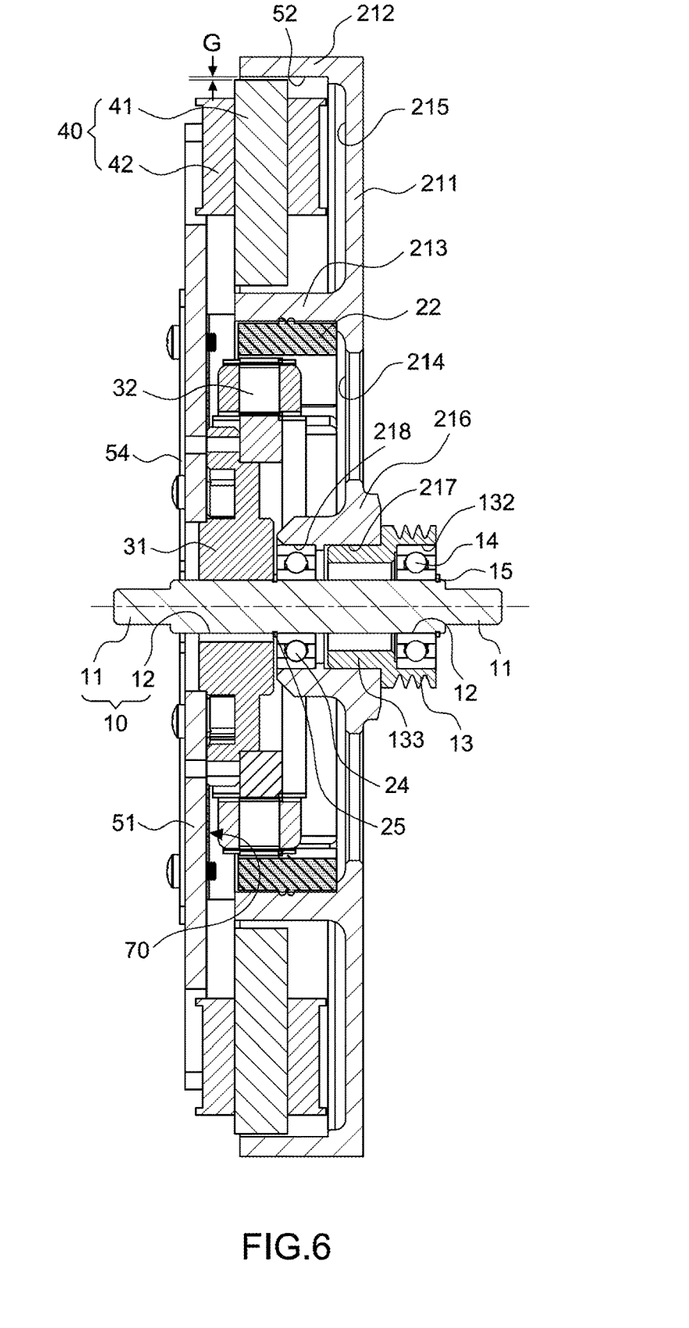
FIG. 6 is a sectional view along line 6-6 in FIG. 5.

Further referring to FIGS. 1B and 2, a controller of the device includes a commutating & wave filtering circuit and an adjustable DC power supply. The commutating & wave filtering circuit converts AC currents produced by a power generator into DC currents, and the controller calculates the torque value entered via a display & control gauge 890 to control the currents supplied from the DC power supply, resulting in the brake core 850, 980 forming eddy current against the flywheel 820. The controller used to connect from the outside via circuit modules; therefore the training machines would not have a space designed for the controller, and there are problems of configuration of wires for installation.

Besides, considering devices of generator combined with magnetic resistance device disclosed in many U.S. patents such as U.S. publication No. 2009/0174271, U.S. Pat. Nos. 6,215,207, 6,952,063, U.S. publication No. 2014/0171266, and U.S. publication No. 2014/0035414 do not mention the techniques of torque calibration, it is reasonably concluded that torque calibration are commonly performed by connection to an external device instead of directly on a training machine itself.

SUMMARY OF THE INVENTION

A primary objective of the present invention is to provide a magnetic-controlled generator with built-in controller that generates electricity and has a magnetic resistance loading device, making it suitable for small training machines with small volume and low costs in manufacturing.

Another objective of the present invention is to provide a magnetic-controlled generator with built-in controller that integrates a controller, a power generator and a magnetic resistance structure, so as to overcome the difficulties in installation of the controller and configuration of the wires.

Yet another objective of the present invention is to provide a magnetic-controlled generator with built-in controller that includes software for torque calibration without the need of extra calibration devices.

Still another objective of the present invention is to provide a magnetic-controlled generator with built-in controller that employs both linear and quadratic regression analysis in torque calibration to accelerate the calibration process and provide more stability.

To achieve the objectives mentioned above, the present invention comprises a shaft having a middle section and two engaging ends to fixedly engage a supporting seat of a training machine; a transmission element to be engaged either of the engaging ends of the shaft for receiving a driving force from the training machine; the transmission element being a pulley in this embodiment; an outer rotor including a flywheel and a plurality of permanent magnets, wherein the flywheel has an outer rim and an inner rim sharing a common axis to form a first annular space, bounded by the inner rim, and a second annular space, disposed between the inner rim and the outer rim, the flywheel engages the shaft to be driven to rotate by the transmission element, the plurality of permanent magnets being fixedly arranged within the first annular space along an inner peripheral edge of the inner rim; an inner stator including a coil holder mounted on the shaft and an armature core assembled along an edge of the coil holder; wherein the inner stator is disposed in the first annular space and an outer edge of the armature core being arranged next to an inner edge of the plurality of permanent magnets; whereby rotation of the outer rotor produces AC currents by the inner stator and the currents are output by an output wire connected to an outside of the armature core; a pair of reluctance devices, each including a stator core having two corresponding indentation spaces to engage a magnetic coil, and an input wire connected to the magnetic coil; an engaging element fixedly engaged with the coil holder and having the stator cores assembled thereon to position the reluctance devices in diametrically opposed relationship within the second annular space; a magnetic ring being arranged—in this embodiment, being directly formed—along an inner peripheral edge of the outer rim of the flywheel and having a gap between an outer edge of the stator cores and an inner edge of the magnetic ring; responsive to DC currents being input via the input wire of the magnetic coil, the stator cores produce a magnetic field and further create eddy reluctance with the coupled magnetic ring, forming internal reverse resistance against the flywheel; a control circuit unit built on a side of the engaging element and connected to the output wire of the armature core, an external digital operator, and the input wire of the magnetic coil, said control circuit unit including a self-activated circuit, a AC-DC conversion circuit, a microprocessor, and a DC control circuit to convert the AC currents from the armature core to DC currents for supplying the magnetic coil; said digital operator receiving a number of torque value from an operator and said microprocessor producing a controlling value for adjusting the currents input from the DC control circuit to form the reverse resistance against the flywheel; and a software for calibration, including a plurality of current values, a plurality of torque values, a number of said current values less than a number of said torque values; said torque values divided into groups by different ranges and said groups inducted into different current values, from each group of torque values a median retrieved rendered as $y_m$ and said plurality of current values rendered as x, thereby a first section and a second section divided by different numbers of said current values to employ a quadratic regression equation $y_m=a_1x^2-b_1x+c$ for calibration when the medians are inducted within the first section and to employ a linear regression equation $y_m=a_2x-b_2$ for calibration when the medians are inducted within the second section, a plurality of points retrieved and checked by the equations rendered as calibration points for further torque calibration, and a communication link further connected to the microprocessor for said software saving the medians of the plurality of torque values from the training machine to the microprocessor for the control circuit unit to operate the adjusting process after calibration operation.

In addition, the transmission element is a pulley. The present invention further includes a wireless transmission unit arranged at the corresponding side of the control circuit unit on a side of the engaging element for signal transmission between the control circuit unit and the external digital operator. The control circuit unit and the wireless transmission unit each has a protective piece arranged on the outside, correspondingly connecting the engaging element.

Furthermore, the control circuit unit and the wireless transmission unit are printed circuit boards disposed diametrically opposed within the second annular space and the pair of reluctance devices are also disposed diametrically opposed with each other within the second annular space, each reluctance device interposed between the control circuit unit and the wireless transmission, so as to form a structure in a flat shape.

With the structure disclosed above, the present invention provides a device with dual function of power generation and reluctance that has small volume and low costs in manufacturing. Also, the integrated design of power generator with magnetic resistance structure, control circuit unit and calibration software excludes the needs of spaces for installation of the controller and configuration of the wires. The calibration software further enables direct torque calibration with faster and more stable operation by regression analysis models.

DETAILED DESCRIPTION OF THE PREFERRED EMBODIMENT

Referring to FIGS. 3-6, a preferred embodiment of the present invention mainly comprises a shaft 10, a transmission element 13, an outer rotor 20, an inner stator 30, a pair of reluctance devices 40, an engaging element 51, a magnetic ring 52, a control circuit unit 60, a software 65 for torque calibration, and a wireless transmission unit 70.

The shaft 10 has a middle section 12 and two engaging ends 11 to be fixedly engaged a supporting seat of a training machine.

The transmission element 13 has a function of receiving the force from the training machine. In this embodiment, the transmission element 13 is a pulley, having a grooved rim 131 for a cord to engage and thus connecting to the training machine; a first bearing hole 132 is arranged for engaging a bearing 14 and being mounted on either of the engaging ends 11, and the bearing 14 is fixed by a C ring 15 so that the pulley 13 is able to rotate on the shaft 10.

The outer rotor 20 includes a flywheel 21 and a plurality of permanent magnets 22. The flywheel 21 has a plate body 211 extending outwardly to form an outer rim 212 and extending inwardly to form an inner rim 213. The outer rim 212 and the inner rim 213 are sharing a common axis to form a first annular space 214 inside the inner rim 213 and a second annular space 215 between the outer rim 212 and the inner rim 213. The permanent magnets 22 are annular and arranged within the first annular space 214 along an inner peripheral edge of the inner rim 213 to engage the flywheel 21. The plate body 211 further has a flange 216 including a hole 217 and a second bearing hole 218 at the center thereof. The hole 217 engages a protruding body 133 of the pulley 13 so that the outer rotor 20 is driven by the pulley 13 and simultaneously rotating therewith. The second bearing hole 218 engages a bearing 24 so that the outer rotor 20 can rotate when mounted on the shaft 10.

The inner stator 30 includes a coil holder 31 and an armature core 32. The coil holder 31 has a shaft hole 311 with a key way 314 arranged therein, a flat surface 312, and an inner flange 313. Mounted on the shaft 10 tightly and having a square key engaging the key way 314, the coil holder 31 is fixed on the shaft 10 and disposed in the first annular space 214. The armature core 32 has a power coil 321 arranged outside and connected to an output wire 323, and a core frame 322 arranged inside with a screw hole 324 thereon. The core frame 322 is fixedly screwed along the edge of the coil holder 31 for the outer edge of the power coil 321 to be arranged next to the inner edge of the permanent magnets 22. Whereby the rotation of the outer rotor 20 would produce AC currents by the power coil 321 and the currents would be output by the output wire 323.

Each of the reluctance devices 40 includes a stator core 41 having two corresponding indentation spaces 411 to engage a magnetic coil 42, and an input wire 43 connected to the magnetic coil 42.

The engaging element 51 has an engaging hole 511 for the inner flange 313 of the coil holder 31 to be mounted thereon, and a surface 513 with a plurality of screw hole 513 to fixedly screw the coil holder 31 thereon.

The magnetic ring 52 is arranged along an inner peripheral edge of the outer rim 212 of the flywheel 21. In this embodiment, the magnetic ring 52 is directly formed on the inner peripheral edge of the outer rim 212 of the flywheel 21. The stator cores 41 have a plurality of screw holes 412 to be fixedly screwed on both sides of the engaging element 51 symmetrically so that the pair of reluctance devices 40 is positioned in diametrically opposed relationship within the second annular spaces 215 of the flywheel 21. The stator cores 41 further have a gap G between an outer edge thereof and an inner edge of the magnetic ring 52; when DC currents are input via the input wire 43 of the magnetic coil 42, the stator cores 41 produce a magnetic field and further create eddy reluctance with coupled magnetic ring 52, forming internal reverse resistance against the flywheel 21.

The control circuit unit 60 is built on a side of the engaging element 51 and covered by a first protective piece 53 screwed aside the engaging element 51. In this embodiment, the control circuit unit 60 is a printed circuit board but is not limited to such application. The wireless transmission unit 70 transmits signals between the control circuit unit 60 and an external digital operator 230; the wireless transmission unit 70 is also a printed circuit board including a Bluetooth device in this embodiment, but is not limited to such application. Additionally, the control circuit unit 60 and the wireless transmission unit 70 are disposed in diametrically opposed relationship within the second annular space 215 and interposed between the pair of reluctance devices 40 so that the structure of the present invention, a magnetic-controlled generator with built-in controller 100, has a structure formed in a flat shape for easier installation in training machines.

Figure 7A:
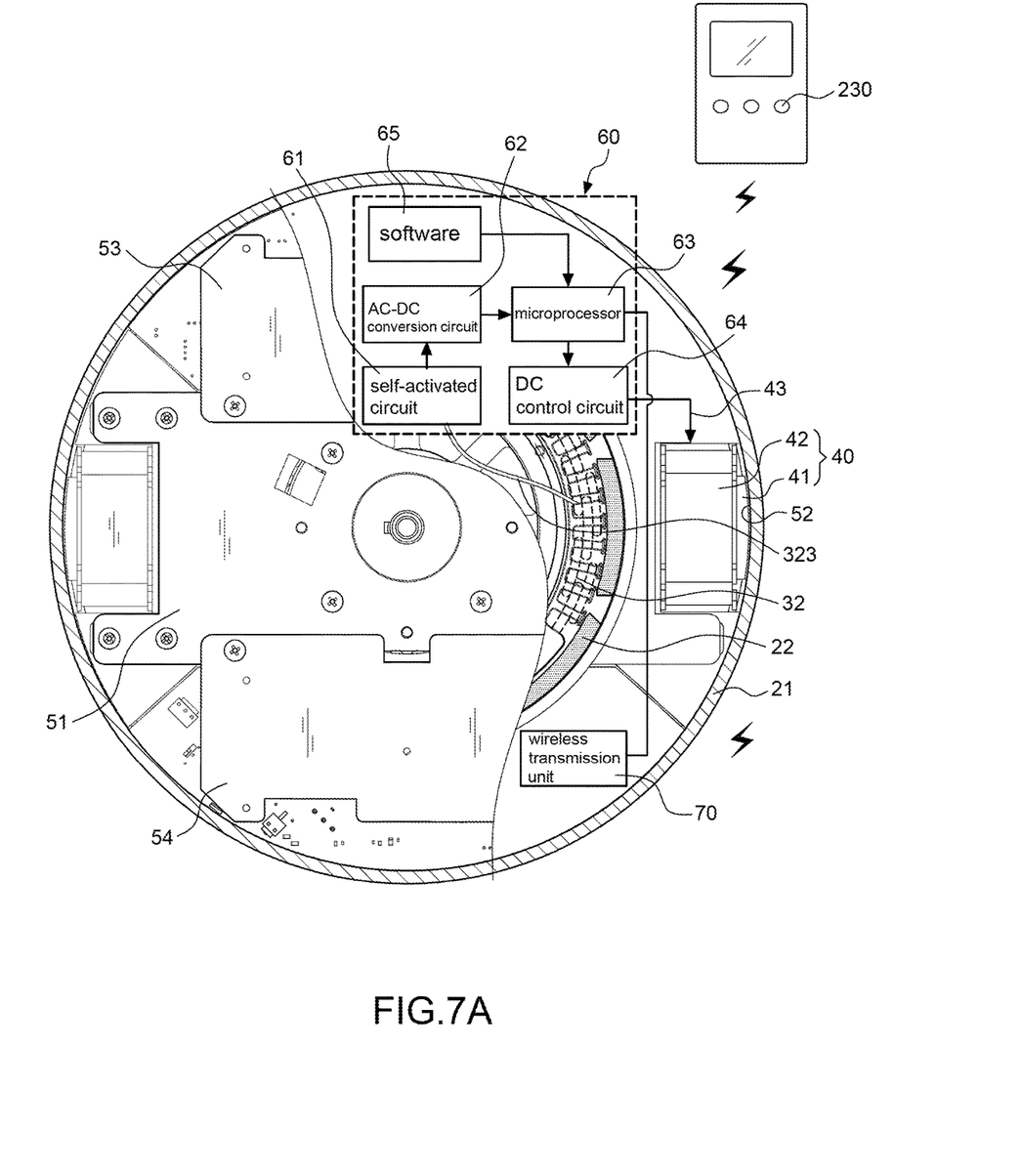
FIG. 7A is a schematic diagram illustrating the structure of a control circuit unit of the present invention.
Figure 7B:
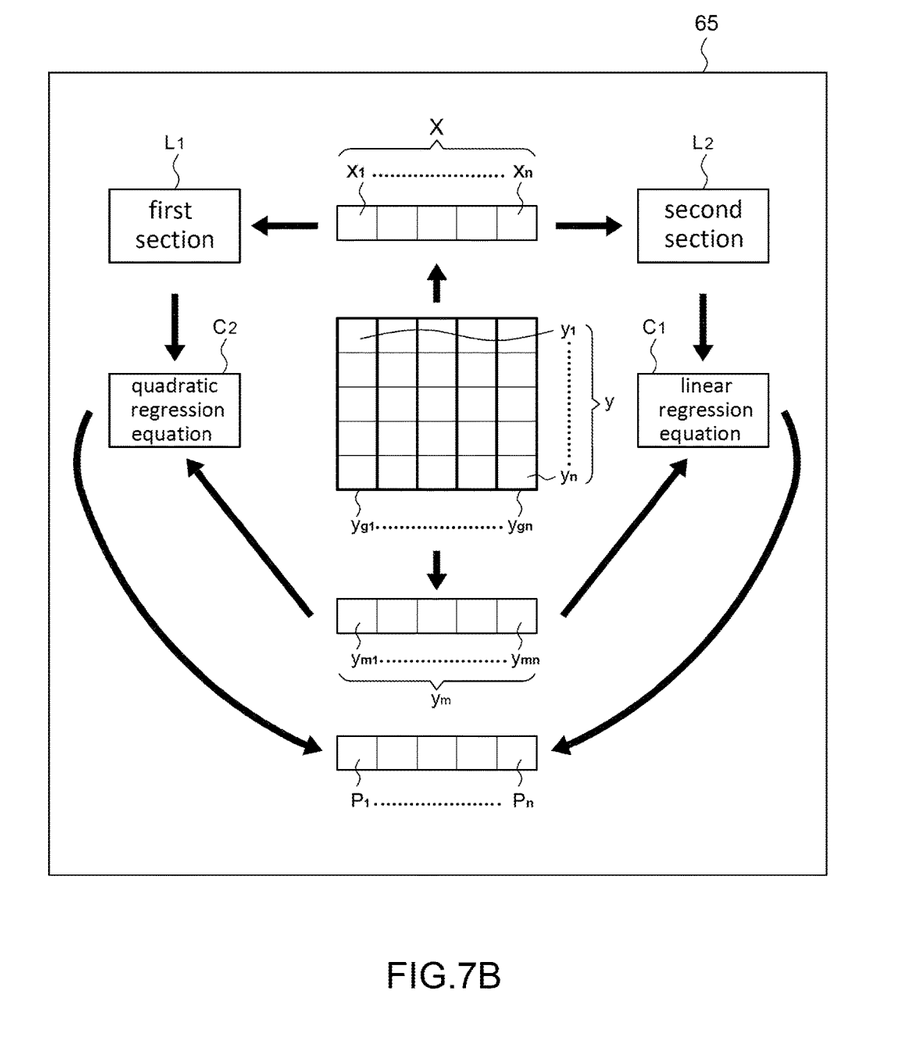
FIG. 7B is a schematic diagram illustrating calibration process of a software according to the present invention.
Figure 7C:
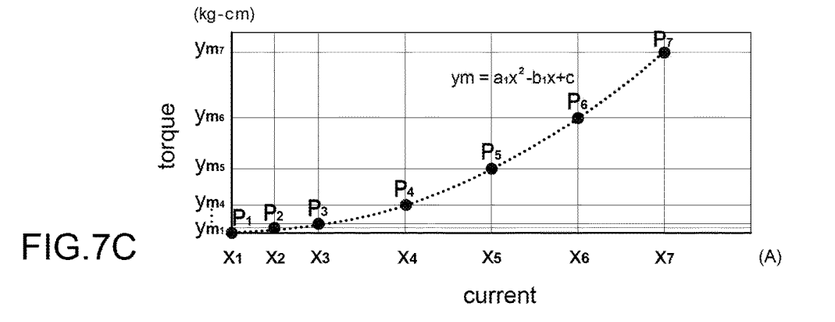
FIG. 7C is a chart illustrating a quadratic regression analysis based on medians of torque values and different current values according to the present invention.
Figure 7D:
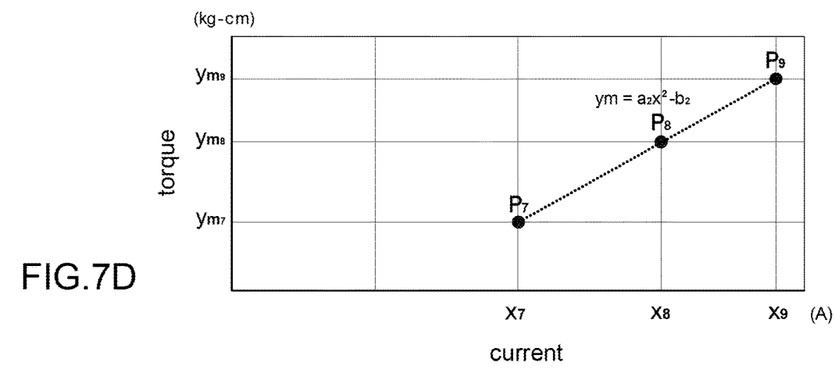
FIG. 7D is a chart illustrating a linear regression analysis based on medians of torque values and different current values according to the present invention.

Referring to FIG. 7A, the control circuit unit 60 includes a self-activated circuit 61, an AC-DC conversion circuit 62, a microprocessor 63, and a DC control circuit 64. The self-activated circuit 61 receives AC currents from the armature core 32 via the output wire 323, and the AC-DC conversion circuit 62 converts the AC currents into stable DC currents, so that when the digital operator 230 receives a number of torque value from an operator, the microprocessor 63 would produce a controlling value for the DC control circuit 64 to adjust the DC currents input to the magnetic coil 42, so as to form a reverse resistance against the flywheel 21.

Further referring to FIGS. 7B-7E, the software 65 includes a plurality of current values x and a plurality of torque values y. The number of the current values $x_1$-$x_n$ is less than the number of the torque values $y_1$-$y_n$. The torque values $y_1$-$y_n$ are divided into groups $y_{g1}$-$y_{gn}$ by different ranges and the groups $y_{g1}$-$y_{gn}$ are inducted into different current values $x_1$-$x_n$; from each of the groups $y_{g1}$-$y_{gn}$ a median $y_1$-$y_m$ is retrieved. Then a first section $L_1$ and a second section $L_2$ are divided by different numbers of current values $x_1$-$x_n$ for regression analysis. A quadratic regression equation $C_2$: $y_m = a_1 x^2 - b_1 x + c$ is employed for the medians $y_m$ inducted within the first section $L_1$, and a linear regression equation $C_1$: $y_m = a_2 x - b_2$ is employed for the medians $y_m$ inducted within the second section $L_2$; a plurality of points $P_1$-$P_n$ are then retrieved from regression analysis based on the equations $C_1$, $C_2$ and rendered as calibration points for further torque calibration of the device 100.

In this embodiment, the current values $x_1$-$x_n$ are $x_1 A$, $x_2 A$, $x_3 A$, $x_4 A$, $x_5 A$, $x_6 A$, $x_7 A$, $x_8 A$, $x_9 A$, and the corresponding medians $y_{m1}$-$y_{mn}$ of the torque values $y_1$-$y_n$ are $y_{m1}$ kg-cm, $y_{m2}$ kg-cm, $y_{m3}$ kg-cm, $y_{m4}$ kg-cm, $y_{m5}$ kg-cm, $y_{m6}$ kg-cm, $y_{m7}$ kg-cm, $y_{m8}$ kg-cm, $y_{m9}$ kg-cm as shown in a chart below. Among the current values $x_1 A$, $x_2 A$, $x_3 A$, $x_4 A$, $x_5 A$, $x_6 A$, $x_7 A$ are divided into the first section $L_1$ and $x_7 A$, $x_8 A$, $x_9 A$ are into the second section $L_2$. Then nine points $P_1$-$P_9$ are retrieved based on the equations $C_1$, $C_2$ and rendered as calibration points for operation. In the retrieving process, a third point $P_3$ is located in the first section $L_1$ and checked by the quadric regression equation $C_2$: $y_m = a_1 x^2 - b_1 x + c$. The current value of the third point $P_3 = x_3 A$ and the median $y_{m3}$ are data fitting in the equation; then we acquire an equation $y_m - a_1(x_3)^2 - b_1(x_3) + c \simeq y_{m3}$ and confirm whether the number of $y_m$ from the equation is close enough to the number $y_{m3}$. If the numbers are close enough, a corresponding current value $x_3 A$ can be matched; therefore the retrieved point $P_3$ is confirmed to be a calibration point. Or an eighth point $P_8$ is located in the second section $L_2$ and has a current value $x_8 A$ to fit in the linear regression equation $C_1$, and then an equation $y_m = a_2(x_8) - b_2 \simeq y_{m8}$ is acquired for checking. If the numbers are close enough, a corresponding current value $x_8 A$ can be matched; therefore the retrieved point $P_8$ is confirmed to be a calibration point. With such progress for calibration check, the software 65 is able to perform instant calibration for the present invention.

Figure 7E:
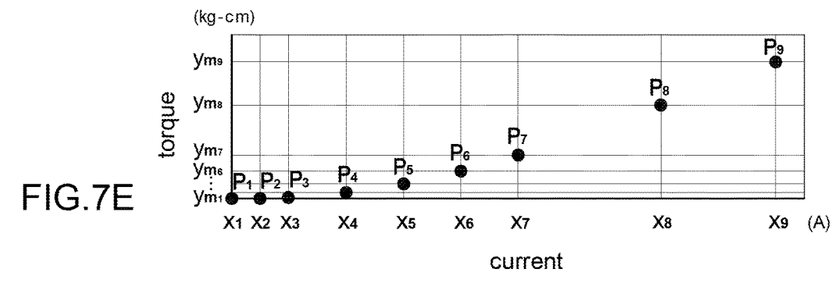
FIG. 7E is a chart illustrating a plurality of points retrieved from regression analysis in FIGS. 7C and 7D according to the present invention.

| Calibration point | $P_1$ | $P_2$ | $P_3$ | $P_4$ | $P_5$ | $P_6$ | $P_7$ | $P_8$ | $P_9$ |
|---|---|---|---|---|---|---|---|---|---|
| Current value (A) | $x_1$ | $x_2$ | $x_3$ | $x_4$ | $x_5$ | $x_6$ | $x_7$ | $x_8$ | $x_9$ |
| Median of torque value (kg-cm) | $y_{m1}$ | $y_{m2}$ | $y_{m3}$ | $y_{m4}$ | $y_{m5}$ | $y_{m6}$ | $y_{m7}$ | $y_{m8}$ | $y_{m9}$ |

Before choosing the median to be the variable $y_m$ in the equations, a statistic experiment was taken by collecting arithmetic means and medians of the torque values of pedals of a group of training machines in revolutions per minute (RPM); then it is concluded that the medians are counted to appear in more than half of the torque values of the training machines and the medians are close to the arithmetic means. Therefore, it appears that numbers of the medians are suitable to be the variable $y_m$ in the equations. On the other hand, taking the medians is also more reasonable since collecting data of the arithmetic means for calibration requires much more time and costs which cannot be performed efficiently when dealing with a great amount of training machines.

Figure 8:
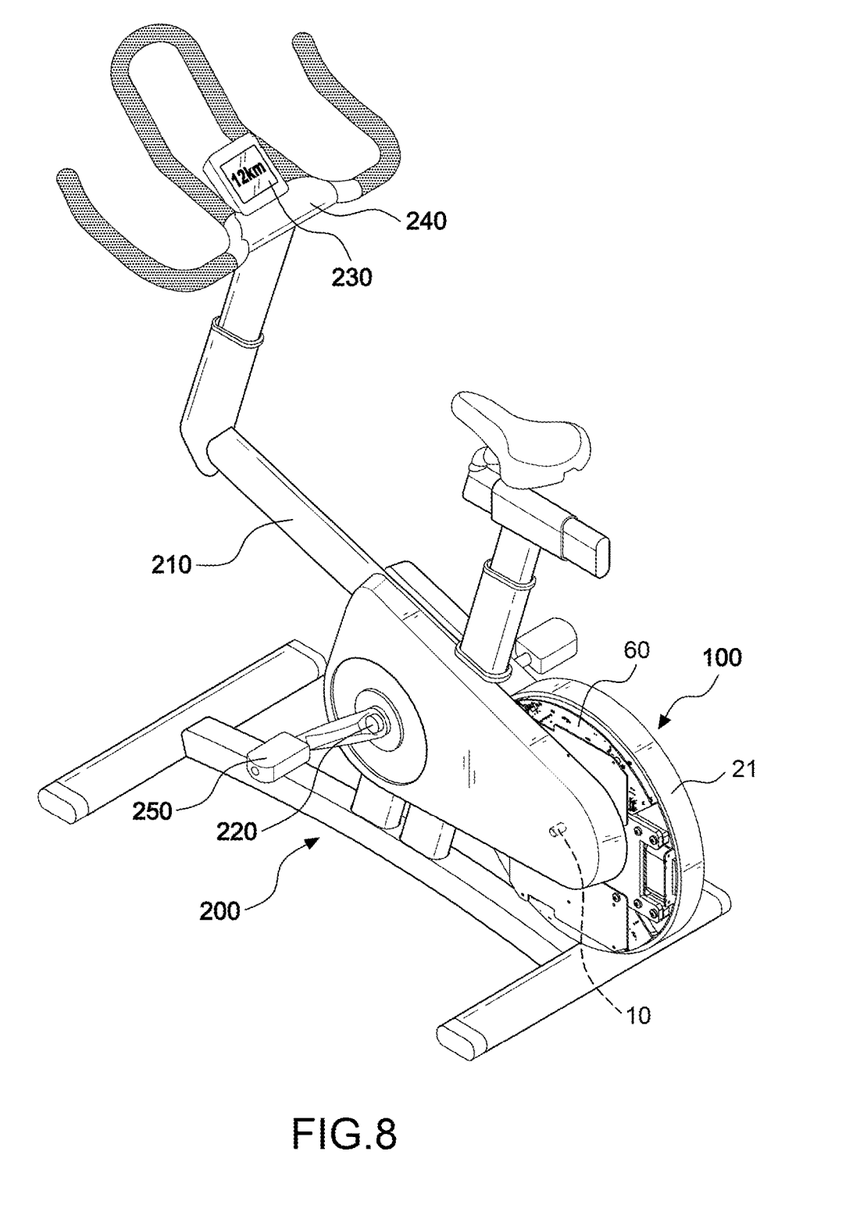
FIG. 8 is a schematic diagram illustrating the present invention applied to training machines.

FIG. 8 is a schematic diagram illustrating the magnetic-controlled generator with built-in controller 100 applied to a training machine 200 in an applicable embodiment. The magnetic-controlled generator with built-in controller 100 has the shaft 10 fixedly engaged a supporting seat of a framework 210 of the training machine 200. The training machine 200 has a pedal shaft 220 connecting a pulley 13 by a cord and a digital operator 230 arranged on a handle 240 of the training machine 200. When the operator enters a number of torque value and runs a pair of pedals 250 to rotate the pedal shaft 220, an armature core 32 would produce AC currents for a AC-DC conversion circuit 62 to produce DC currents and a microprocessor 63 would calculate a originally set torque value and a median $y_m$ of torque values of the training machine 200 for the DC control circuit 64 to output an appropriate amount of currents. Then a pair of reluctance device 40 and a magnetic ring 52 would form a reverse resistance against a flywheel 21 for the training machine 200, so as to achieve the purpose of training.

With the structure disclosed above, the present invention has the reluctance devices 40 and the control circuit unit 60 disposed within the second annular space 215 of the flywheel 21 without interfering operation of the flywheel 21. Also, with an integrated structure of the power generator, the magnetic resistance structure and the control circuit unit 60, there is no trouble in the need of spaces for installation of the controller and configuration of the wires. On the other hand, the software 65 is directly installed in training machines to perform torque calibration instantly and efficiently by regression analysis and to avoid setting and connection to extra calibration devices.

Although particular embodiments of the invention have been described in detail for purposes of illustration, various modifications and enhancements may be made without departing from the spirit and scope of the invention. Accordingly, the invention is not to be limited except by the appended claims.

What is claimed is:

1. A magnetic-controlled generator with built-in controller to be applied to training machines, comprising:
   a shaft fixedly engaging a supporting seat of a training machine;
   a transmission element to engage an end of the shaft for receiving a driving force from the training machine;
   an outer rotor including a flywheel and a plurality of permanent magnets, wherein the flywheel has an outer rim and an inner rim sharing a common axis to form a first annular space, bounded by the inner rim, and a second annular space, disposed between the inner rim and the outer rim; the flywheel engages the shaft to be driven to rotate by the transmission element; and the plurality of permanent magnets are fixedly arranged within the first annular space along an inner peripheral edge of the inner rim;
   an inner stator including a coil holder mounted on the shaft and an armature core assembled along an edge of the coil holder, wherein the inner stator is disposed in the first annular space and an outer edge of the armature core is arranged next to an inner edge of the plurality of permanent magnets; whereby rotation of the outer rotor produces AC currents by the inner stator and the currents are output by an output wire connected to outside of the armature core;
   a pair of reluctance devices, each including a stator core having two corresponding indentation spaces to engage a magnetic coil, and an input wire connected to the magnetic coil;
   an engaging element fixedly engaged with the coil holder and having the stator cores assembled thereon to position the reluctant devices in diametrically opposed relationship within the second annular space;
   a magnetic ring being arranged along an inner peripheral edge of the outer rim of the flywheel and having a gap between an outer edge of the stator cores and an inner edge of the magnetic ring;
   responsive to DC currents being input via the input wire of the magnetic coil, the stator cores produce a magnetic field and further create eddy reluctance with the coupled magnetic ring, forming internal reverse resistance against the flywheel;
   a control circuit unit built on a side of the engaging element and connected to the output wire of the armature core, an external digital operator, and the input wire of the magnetic coil, said control circuit unit including a self-activated circuit, a AC-DC conversion circuit, a microprocessor, and a DC control circuit to convert AC currents from the armature core to DC currents to supply for the magnetic coil, said digital operator receiving a number of torque value from an operator and said microprocessor producing a controlling value for adjusting the currents input from the DC control circuit to form the reverse resistance against the flywheel; and
   a software for calibration, including a plurality of current values, a plurality of torque values, a number of said current values less than a number of said torque values; said torque values divided into groups by different ranges and said groups inducted into different current values, from each group of torque values a median retrieved rendered as and said plurality of current values rendered as x, thereby a first section and a second section divided by different numbers of said current values to employ a quadratic regression equation $y_m = a_1 x^2 - b_1 x + c$ for calibration when the medians are inducted within the first section and to employ a linear regression equation $y_m = a_2 x - b_2$ for calibration when the medians are inducted within the second section, a plurality of points retrieved and checked by the equations rendered as calibration points for further torque calibration, and a communication link further connected to the microprocessor for said software saving the medians of the plurality of torque values from the training machine to the microprocessor for the control circuit unit to operate the adjusting process after calibration operation.

2. The magnetic-controlled generator with built-in controller as claimed in claim 1, wherein the transmission element is a pulley.

3. The magnetic-controlled generator with built-in controller as claimed in claim 1, wherein the present invention further includes a wireless transmission unit arranged at the corresponding side of the control circuit unit on a side of the engaging element for signal transmission between the control circuit unit and the external digital operator.

4. The magnetic-controlled generator with built-in controller as claimed in claim 3, wherein the control circuit unit and the wireless transmission unit each has a protective piece arranged on the outside, correspondingly connecting the engaging element.

5. The magnetic-controlled generator with built-in controller as claimed in claim 3, wherein the magnetic ring is directly formed on the inner peripheral edge of the outer rim of the flywheel.

6. The magnetic-controlled generator with built-in controller as claimed in claim 3, wherein the control circuit unit and the wireless transmission unit are printed circuit boards disposed in diametrically opposed relationship within the second annular space and the pair of reluctance devices are also disposed diametrically opposed with each other within the second annular space, each reluctance device interposed between the control circuit unit and the wireless transmission, so as to form a structure in a flat shape.

* * * * *